(12) United States Patent
Guasch Murillo (10) Patent No.: US 6,882,123 B1
(45) Date of Patent: Apr. 19, 2005

(54) SYSTEM AND METHOD TO SIMULATE AND EVALUATE MANAGEMENT ALGORITHMS OF A PANEL OR MOBILE WINDOW, ACTIVATED BY AN ELECTRIC MOTOR, WITH ANTI-CRUSHING SECURITY AND PROGRAMME FOR ITS EXECUTION

(75) Inventor: Daniel Guasch Murillo, Valls (ES)

(73) Assignee: Lear Automotive (EEDS) Spain, S.L., Tarragona (ES)

( * ) Notice: Subject to any disclaimer, the term of this patent is extended or adjusted under 35 U.S.C. 154(b) by 0 days.

(21) Appl. No.: 10/343,026

(22) PCT Filed: Jul. 27, 2000

(86) PCT No.: PCT/ES00/00285

§ 371 (c)(1),
(2), (4) Date: Jul. 14, 2003

(87) PCT Pub. No.: WO02/12670

PCT Pub. Date: Feb. 14, 2002

(51) Int. Cl.$^7$ .................................................. H02P 1/40
(52) U.S. Cl. ........................ 318/264; 318/283; 318/569; 318/600; 701/49
(58) Field of Search ................................ 318/264–266, 318/283, 286, 567, 569, 600; 701/36, 49

(56) References Cited

U.S. PATENT DOCUMENTS

| | | | |
|---|---|---|---|
| 4,839,812 A | | 6/1989 | Nusser et al. |
| 5,334,876 A | * | 8/1994 | Washeleski et al. ....... 307/10.1 |
| 5,796,365 A | * | 8/1998 | Lewis .................... 342/357.03 |
| 5,897,602 A | * | 4/1999 | Mizuta ........................ 701/201 |
| 6,009,363 A | * | 12/1999 | Beckert et al. ................ 701/33 |
| 6,064,165 A | * | 5/2000 | Boisvert et al. ............. 318/465 |
| 6,573,678 B1 | * | 6/2003 | Losey et al. ................. 318/470 |

FOREIGN PATENT DOCUMENTS

| | | |
|---|---|---|
| DE | 3431076 | 3/1986 |
| EP | 877309 | 11/1988 |
| FR | 2767395 | 2/1999 |

* cited by examiner

Primary Examiner—Rina Duda
(74) Attorney, Agent, or Firm—Sughrue Mion, PLLC (57) ABSTRACT

A system and method to simulate and evaluate management algorithms of a panel or mobile window, activated by an electric motor, with anti-crushing security and a program for its execution.

It includes a modular structure integrating a series of models representative of the electric parameters of the electric motor, mobile panel performance, incidence of a possible obstacle and an activation and control methodology implemented by means of a sequential state machine related to starting, stopping and/or motor displacement direction according to position and panel displacement direction and a module to evaluate an algorithm to be validated on introducing the current supplied to the motor and its angular speed and which analyzes said values and its temporary evolution and combinations between some or other values. Said models and modules are implemented in a high level programming language.

21 Claims, 9 Drawing Sheets

SYSTEM AND METHOD TO SIMULATE AND EVALUATE MANAGEMENT ALGORITHMS OF A PANEL OR MOBILE WINDOW, ACTIVATED BY AN ELECTRIC MOTOR, WITH ANTI-CRUSHING SECURITY AND PROGRAMME FOR ITS EXECUTION

CROSS-REFERENCE TO RELATED APPLICATION

This application is a 371 of PCT/ES00/00285, filed Jul. 27, 2000. The disclosure of which is incorporated herein by reference.

FIELD OF THE INVENTION

This invention is included in the field of simulation systems, implemented by computer and applied to the analysis of electro-mechanical assemblies. Specifically, the invention is conceived for its application to a window opening/closing device of a vehicle, activated by an electric motor and having anti-crushing security. However, its field of application may crushing security. However, its field of application may be generalised to any type of panel or mobile window evaluate said algorithm and being able to optimize it, by modification of any of its parameters according to the results provided by the system, according to the method recognized.

The invention provides both a system and a method to simulate and validate management algorithms of a panel or mobile window.

The invention also provides a program loadable in the internal memory of a computer to perform the stages of the method according to the invention.

BACKGROUND OF THE INVENTION

Regarding electronic control devices, with anti-crushing security, there is a related electric motor activating a panel, such as a vehicle window and there are several system embodiments and methods, it being possible to mention the patents EP-A-267064, DE-A-4315637, EP-A-714052, U.S. Pat. Nos. 6,002,228, 5,994,858, 5,983,567, 5,949,207, 5,945,796.

Generally, these methods propose the use of position and current sensors providing information to execute a control algorithm. Some of the patents also mention the use of angular speed sensors of the motor and/or activation torque detectors of said motor.

In the state-of-the-art are also known patents directed to the evaluation of electric circuits based on a representation of the mentioned circuit in a high level programming language or HDL, which is characterized by integrating some types of data and specialized semantic constructions to describe electronic components and devices and their connectivity. In this sense, it is possible to mention the patents U.S. Pat. Nos. 5,604,895, 5,671,352 and WO-A-99/49393.

Regarding the mentioned background, the present invention provides a system and method, specially conceived to evaluate control algorithms and strategies of an electric motor which activates a panel or mobile window, like those mentioned in the first group of patents, based on a model structure and modules implemented as from empirical data or theoretical modelling described in a high level programming language. Said models and modules are operatively interrelated in such a way that they provide great flexibility (different input data such as current, speed, significant thresholds of one or other parameter, etc.) or changes in the models and reliability of the estimated results obtained, specifically permitting an optimization of the mentioned algorithms by modification of any of their parameters, to reach a quicker and more effective response before the incidence of an obstacle in the displacement of the mentioned mobile panel, to be considered later, taking its preferred use as the window of a vehicle into consideration.

Likewise, the invention provides a visual interface offering an image in real time, representative of the evolution of some of the mentioned parameters, for example, current supplied to the motor, position of the vehicle window and angular speed and torque of the motor during the ascent and descent stages or the sudden encounter with an obstacle it unexpectedly intercepts in its run.

Generally speaking, the objects of the invention may be summarized as follows:

validate a control strategy of an electronic motor for a window opening/closing device, with anti-crushing security, materialized in an algorithm;

analyze and study the behaviour of said algorithm in several situations (different obstacles, operation stages, starting, ascent, descent; system speed, etc.) and introduce improvements, that is, optimize it;

offer simulations of said algorithm with different data introduced in the system.

BRIEF DESCRIPTION OF THE INVENTION

The invention, consisting of a system or method implemented by computer, is preferably applied to simulate and evaluate management algorithms of a vehicle window or window, activated by an electric motor, with anti-crushing security, whose window is mobile, being displaced in a determined path, between two extreme positions and whose security mode operates such that the edge of the panel closure, such as a vehicle window, cannot trap and compress a user's limb or any other object that may interfere with the displacement of said window, including a series of sensors to provide information about some operation parameters of said electric motor and regarding position of the window.

With respect to said object, the invention proposes a series of models and modules representing the assembly of electromechanical components of a window opening/closing device and the influence of agents like friction and a possible obstacle, which equal to the mentioned sensors, are implemented by means of a high level programming language, prepared to control flow sentences, functions, data structures, input/output and programming characteristics orientated to the object. In the embodiment examples of the invention described in the attached drawings, the mentioned programming language was MATLAB for modelling, simulation, prototype analysis, exploration, displaying, generation of source language and construction of user graphic interfaces. The environment of said MATLAB language used in the implementation of the system and method according to the invention is related to the set of SIMULINK programs prepared to model, simulate and analyze linear and non-linear dynamic systems, STATEMATE which uses Finite State machine theory and notes of flow diagrams to describe the performance of complex systems, POWER SYSTEM BLOCKSET, whose libraries contain models of electric and electronic components and connectors, SPICE and other language libraries, besides the graphic treatment system.

The system and method according to the invention has been based on:

a representative synthesis model of window opening/closing device behaviour;

real data of many marketed window opening/closing devices with an anti-crushing system;

real data of a test prototype.

The essential characteristics of the invention are gathered in its independent claims 1 and 11.

Other additional details, illustrating beneficial aspects of the invention are described in the respective independent claims.

For a better understanding of the invention characteristics, a description will be made in reference to some illustrative drawings.

BRIEF EXPLANATION OF THE DRAWINGS

In said drawings:

FIG. 7 illustrates a schematic diagram showing the connectivity between the module housing the algorithm and a triggering model and motor control, resulting in a machine of sequential states, illustrated in FIGS. 8 and 8a.

DETAILED DESCRIPTION OF AN EMBODIMENT EXAMPLE OF THE INVENTION

Figure 1:
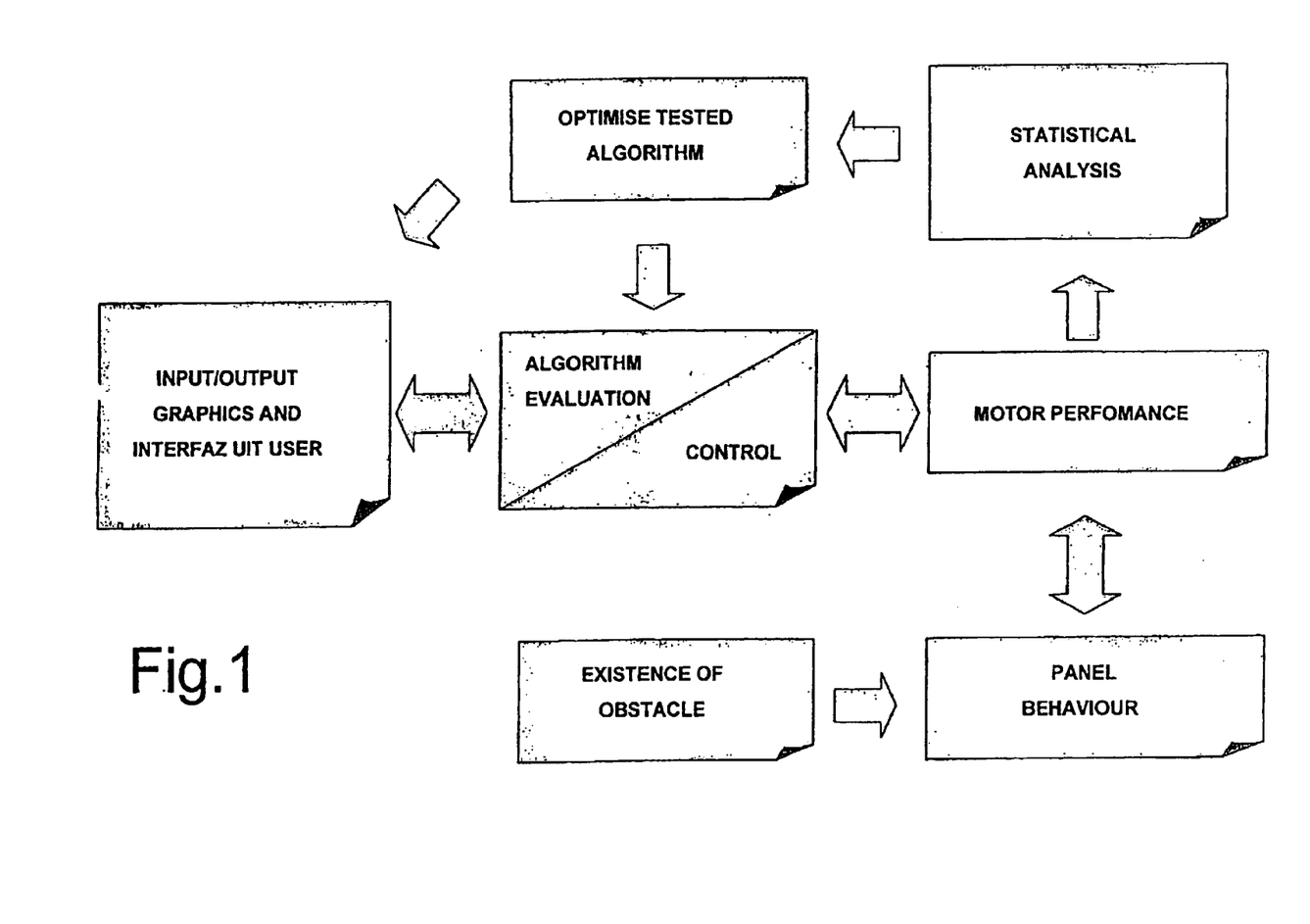
FIG. 1 is a block diagram illustrating the models and modules integrating the system according to the present invention and their one or two way connectivity.

FIG. 1 shows the set of models and modules integrating the system of the invention according to the following:

representative model of motor performance;

representative model of panel or mobile window behavior;

representative model of the window opening/closing device when an obstacle exists;

module for algorithm evaluation to be validated;

triggering model and control over the panel or mobile window;

interface module with the user, with input and output of command orders, data and graphics, likewise having illustrated two complementary modules for statistical analysis and display of results in real time and a module to optimize the algorithm tested, prepared to modify any of its properties and to be reintroduced in the system.

Figure 2:
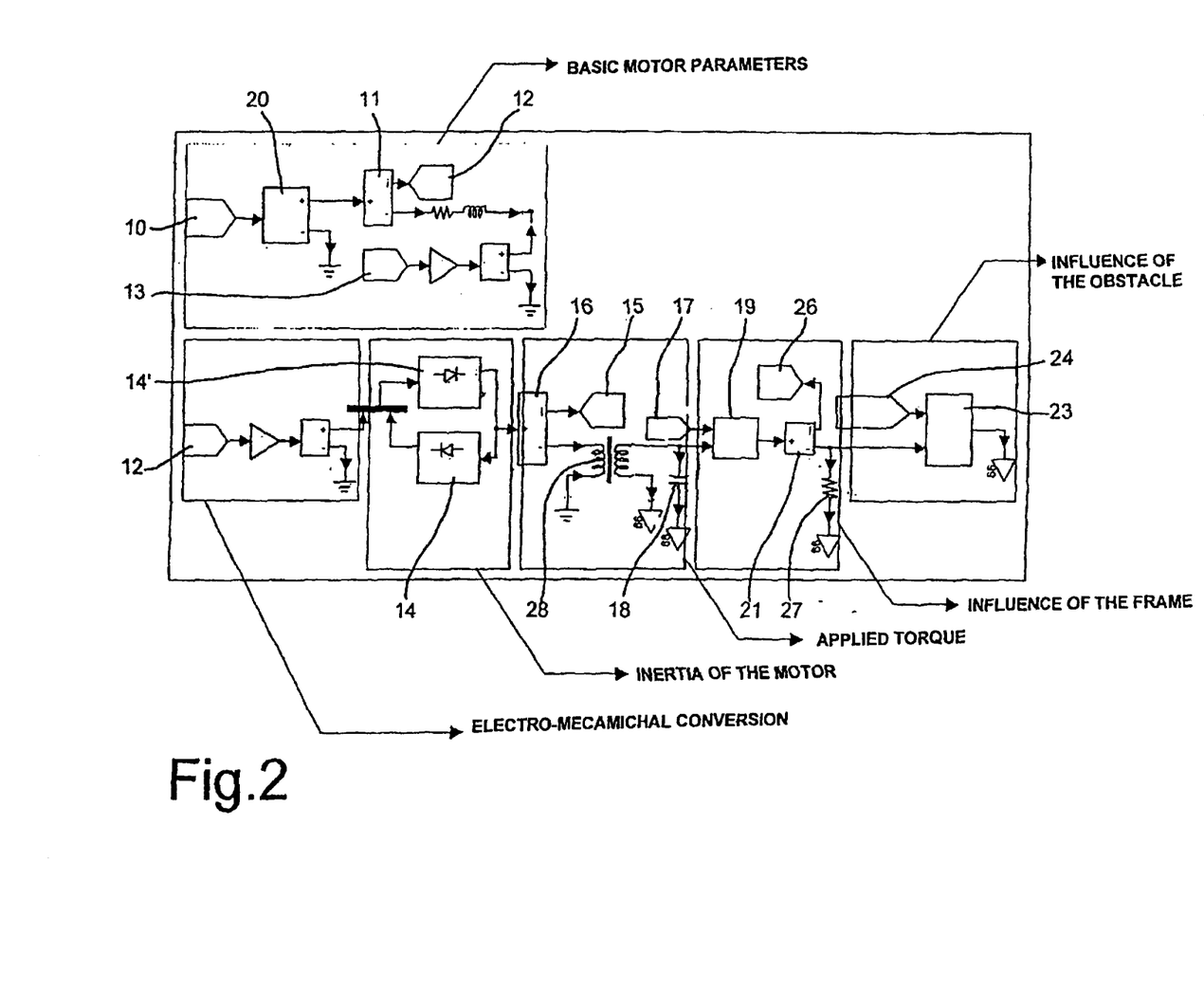
FIG. 2 is illustrative of the model components, providing a representation of electric motor performance, with its basic parameters of electro-mechanical conversion and motor inertia, likewise considering the possible influence of the own window characteristics and of an obstacle.

FIG. 2 shows the first of the mentioned models in greater detail, representing motor performance, observing in its upper part a block illustrating basic motor parameters indicating, a Vg 20 voltage source linked to a reference voltage signal 10 or input signal, a current measurer 11, associated to a current signal 12 and a subset 13 representing the supply of the counter-electromotive force, which has been materialized by a multiplier factor indicated by a constant K. In the lower part and first inset from the left, a block is indicated representing the electro-mechanical conversion from the current signal 12. The second block illustrates the inertia of the motor by means of a non-linear network implemented by the diode pair 14, 14'. The following adjacent block represents the applied torque and includes a power source 15, indicative (proportional) for said torque, a measurer 16 of the value of said voltage and a transformer 28 linking with the next block, representing the influence of the frame and which includes a network of non-linear diodes 19, a voltage measurer 21 whose block links with a last assembly representing the influence of the obstacles implemented by means of a network of loads 23 with access to an inset 24 indicating the existence or not of an obstacle, that may adopt two states: enabled-disabled.

Figure 3:
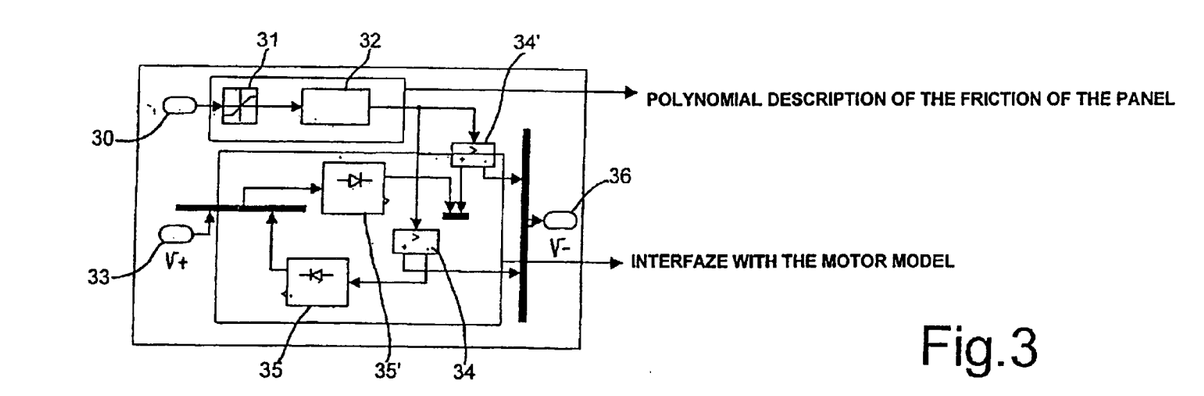
FIG. 3 illustrates the representative model of panel or vehicle window behavior.

FIG. 3 illustrates the model representing the performance of the panel or mobile window, which includes a block representing the friction of the panel with input 30, indicating window position, a stage 31 to prevent undesired values and a function 32 or polynomial simulating the response of dynamic friction of a mobile window, activated by an electric motor, with the guiding devices thereof and which have been obtained from empirical data, according to a determined type of panel and some corresponding guides foreseen for its propulsion. In the lower part, there is a second block indicative of the interface with the motor model and which includes a voltage input 33, a non-linear network, implemented by the diodes 35, 35' and some controlled voltage sources 34, 34', generating a voltage output 36.

Figure 4:
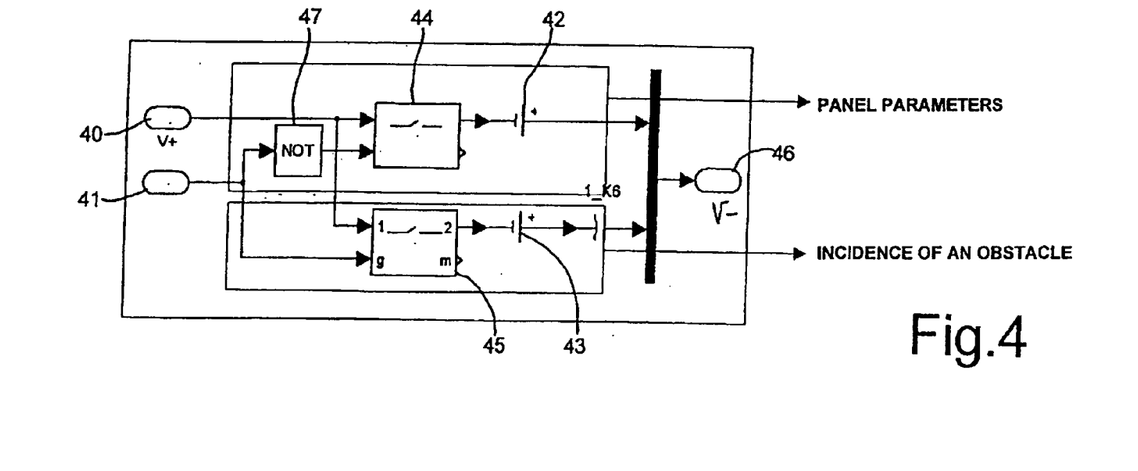
FIG. 4 shows the model representing the incidence of a possible obstacle on the mentioned panel or mobile window, considering the combination of window-obstacle.

FIG. 4 shows the model representing the incidence of an obstacle, including an upper block integrating a voltage input 40, an ideal switch 44 and a condenser 42, indicating the window weight. Likewise, the obstacle is represented by a condenser 43 (of greater or lesser charge according to the type of obstacle), related by an ideal switch 45 to an input 41, that may be enabled or disabled, signalling the existence or not of said obstacle, both blocks meeting in the voltage output 46.

Figure 5:
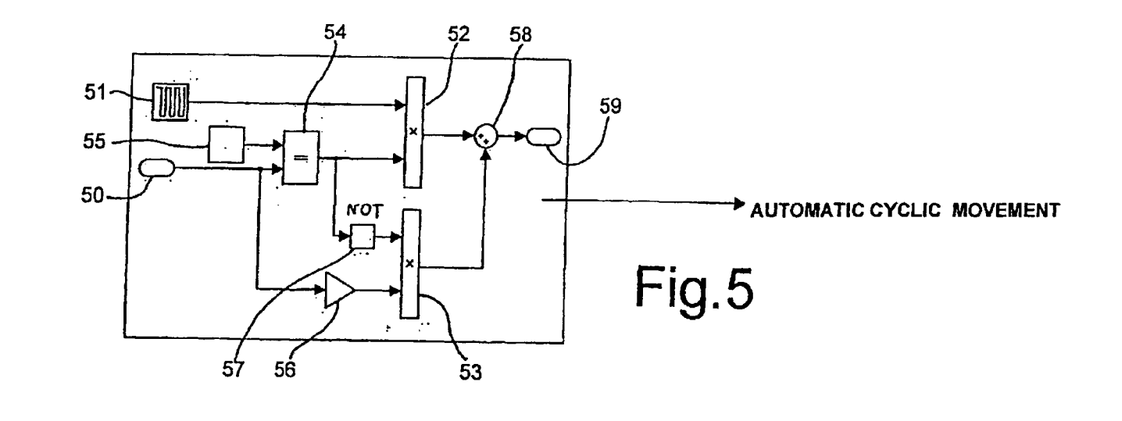
FIG. 5 shows a stage conceived to generate an automatic cyclic movement of the window opening/closing device.

FIG. 5 shows a block indicating window displacement, consisting of two inputs 50 that may adopt the values −1 (descent), 0 (stop), 1 (ascent) or 2 (operation in a continuous cycle, integrating logic multipliers 52, 53, the first having access to a periodic voltage signal, as well as said first signal 50 after passing through a relational operator 54 loaded by a constant 55 and the signal 50 having access to said second logic multiplier, before its passage through the amplified relational operator in 56 and after said relational operator and inverted by the logic operator 57. The outputs of the two logic multipliers, 52, 53 are combined in a totalizer 58 producing an output signal 59 with a value −1, 0 or 1 or a succession of said values to generate a cyclic movement.

Figure 6:
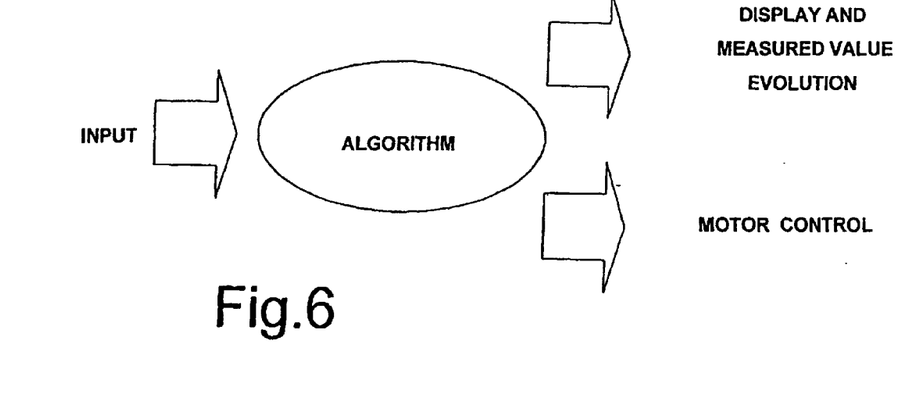
FIG. 6 shows diagrammatically the function principle of the algorithm evaluation module, to which a series of inputs have access: current, angular speed values, etc. for the electric motor, as well as any type of parameter to modify the work points of different model components and system modules and whose module provides a first output which acts over a triggering module and motor control and in turn a second output permitting the observation and processing of assembly performance evolution.
Figure 7:
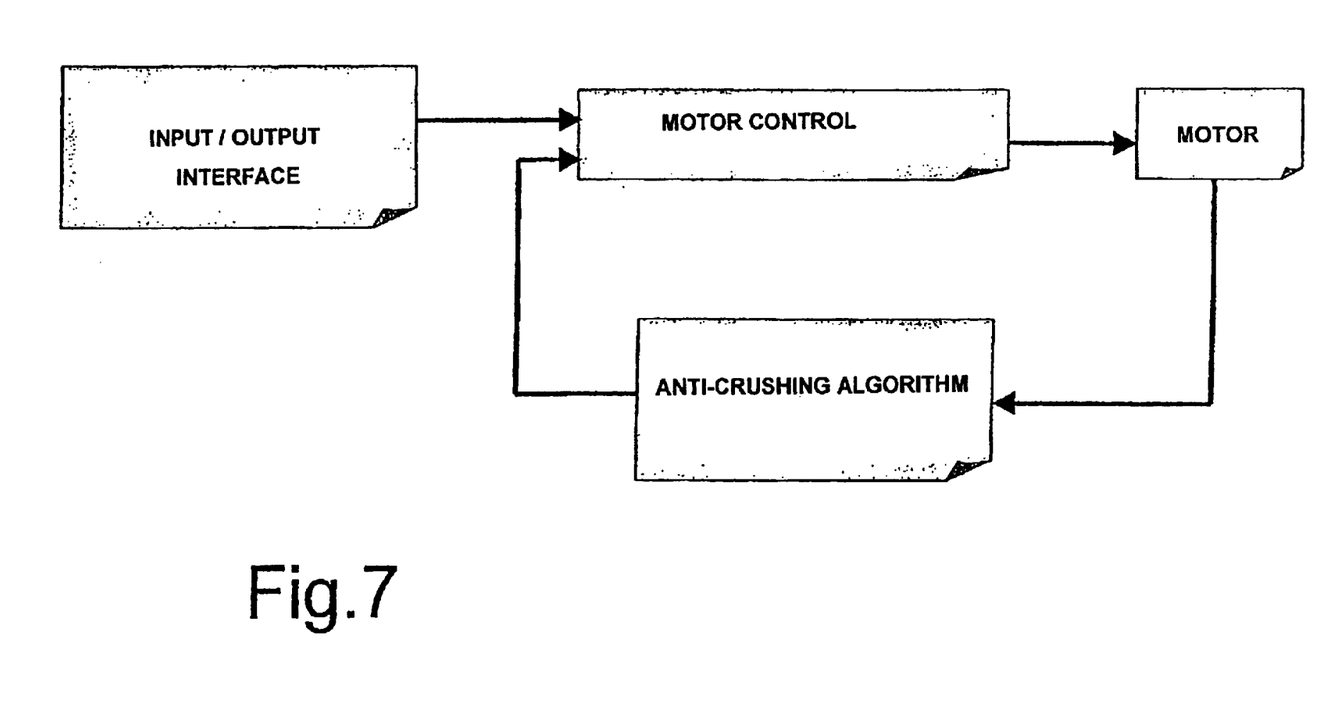
Figure 8:
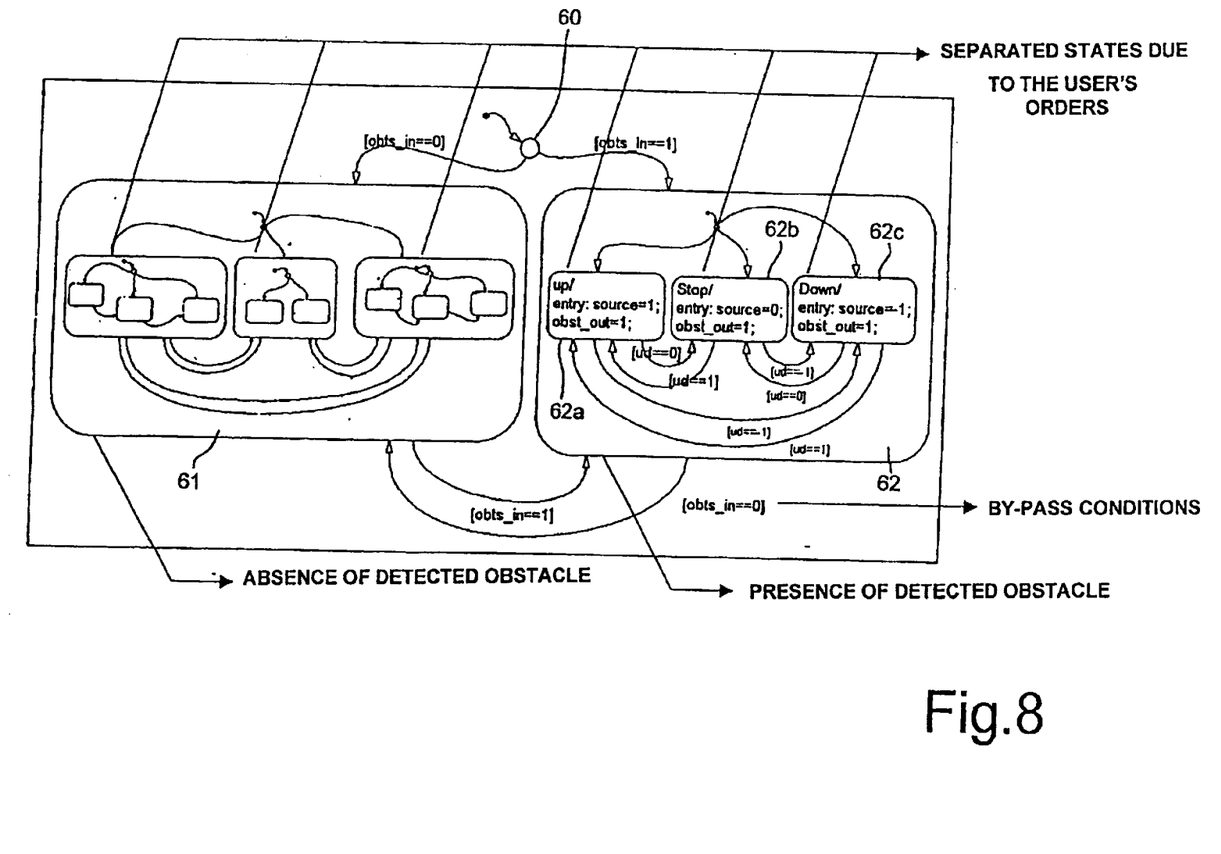
Figure 8A:
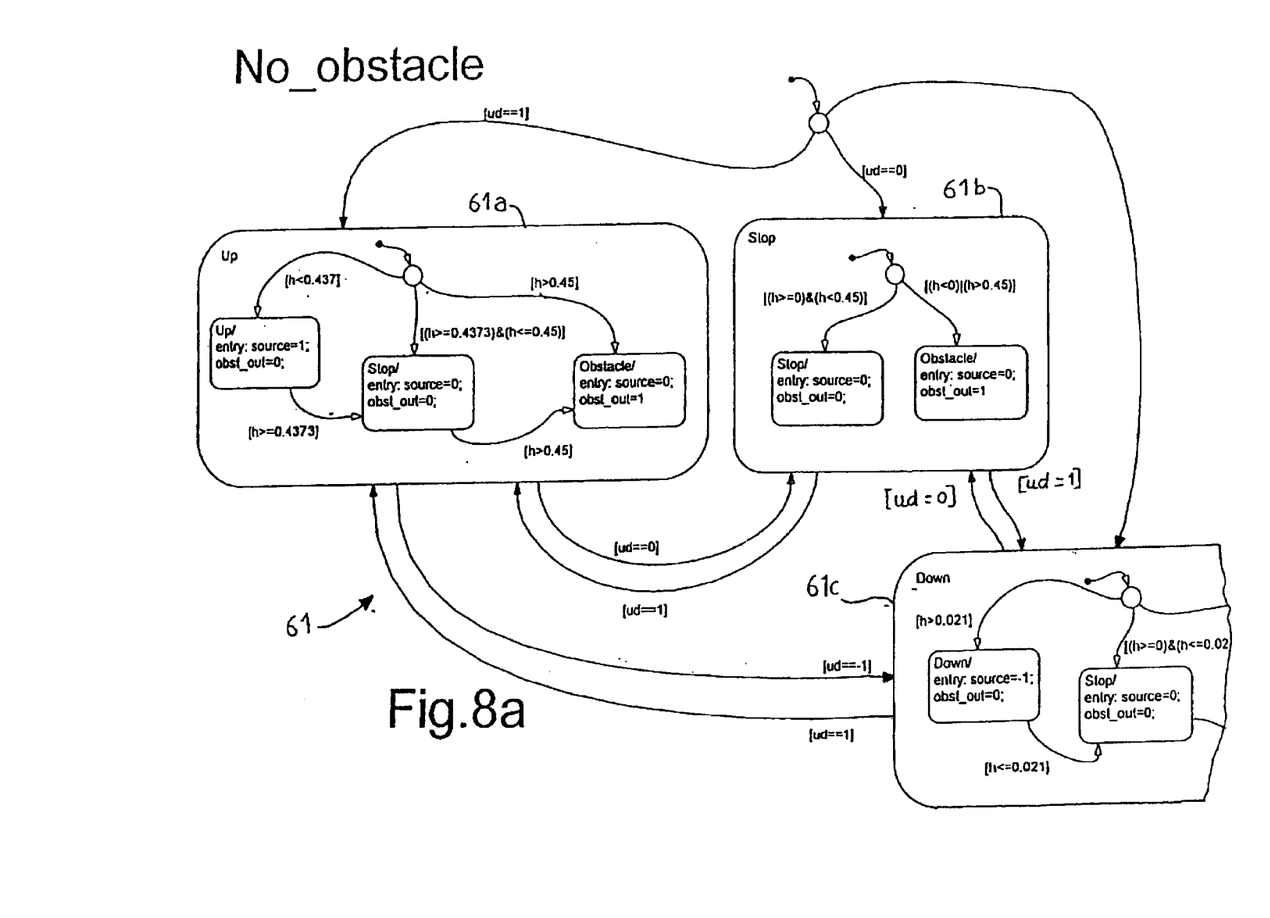

In FIGS. 6 and 7, the system operative and method of this invention are exemplified, observing that the anti-crushing algorithm receives a refeed of some motor operation values (for example, current and angular speed) and incises over a motor control block based on a sequential state motor shown in FIGS. 8 and 8a, forming a closed loop. On the other hand, in FIG. 6, it is indicated that as from said algorithm, a display and measured value evolution processing is also obtained, for example, current supplied to the motor and angular speed, in the different operation phases and in situations with or without obstacle. These values are stored in some memories and on the basis of the latter analysis may be made, for example, statistical, representative curves of the time evolution of current, angular speed, etc. in different conditions, raising the window, descent, continuous cycle, obstacles in ascent, descent, etc.

The triggering and control model over the mobile window is shown in FIG. 8, where two main blocks appear, differentiated from those accessed as from a node 60, that on the left 61, illustrating the control situation in absence of an obstacle (amplified in FIG. 8a) and that on the right 62 showing the control operating in the presence of an obstacle. Said model is based on a series of separate states due to the user's orders, linked by some orders or by-pass conditions imposing a variation on one of the parameters defining the status. The block 62 on the right includes three sub-blocks 62a, 62b and 62c which are accessed to according to the direction of window movement or voltage source values: ud=1 (ascent), ud=0 (stop) and ud=−1 (descent). The transition from one sub-block to another in case of an obstacle is executed by a change in the movement condition and hence, it may pass from any of the extreme sub-blocks 62a, 62c to a stop situation, by applying a voltage value of 0, or by producing an inversion of the movement direction by jumping directly from one to the other of said extreme sub-blocks 62a, 62c by applying a voltage value inverse to that existing inside the sub-block. As from a stop situation and in the presence of an obstacle, the window will be separated from the latter by jumping to one or other of the adjacent sub-blocks. In case of the sub-block on the left shown in FIG. 8a, the displacement limits, or obstacles, will only be imposed by the situation of the window in relation to the upper and lower limits of its movement in relation to a window frame and for such a purpose, within each sub-block 61a, 61c to which it access in ascent or descent as from an origin node, there existing three possibilities according to the position of said panel in relation to some upper and lower limits of its run. In the case of the intermediate sub-block 61b, indicating the stop situation, only two sub-blocks appear, depending on the position of said window. The transition from one to another sub-block is executed through the intermediate sub-block 61b or between the two extremes 61a, 61c varying the panel movement direction. As indicated by the Figure, transitions may also be possible between the first main block 61 and the second one 62 or viceversa, generated by the existence or not of an obstacle.

The method described until this point may be implemented in a programme, loadable in a computer memory, which is also an object of this invention.

Figure 9:
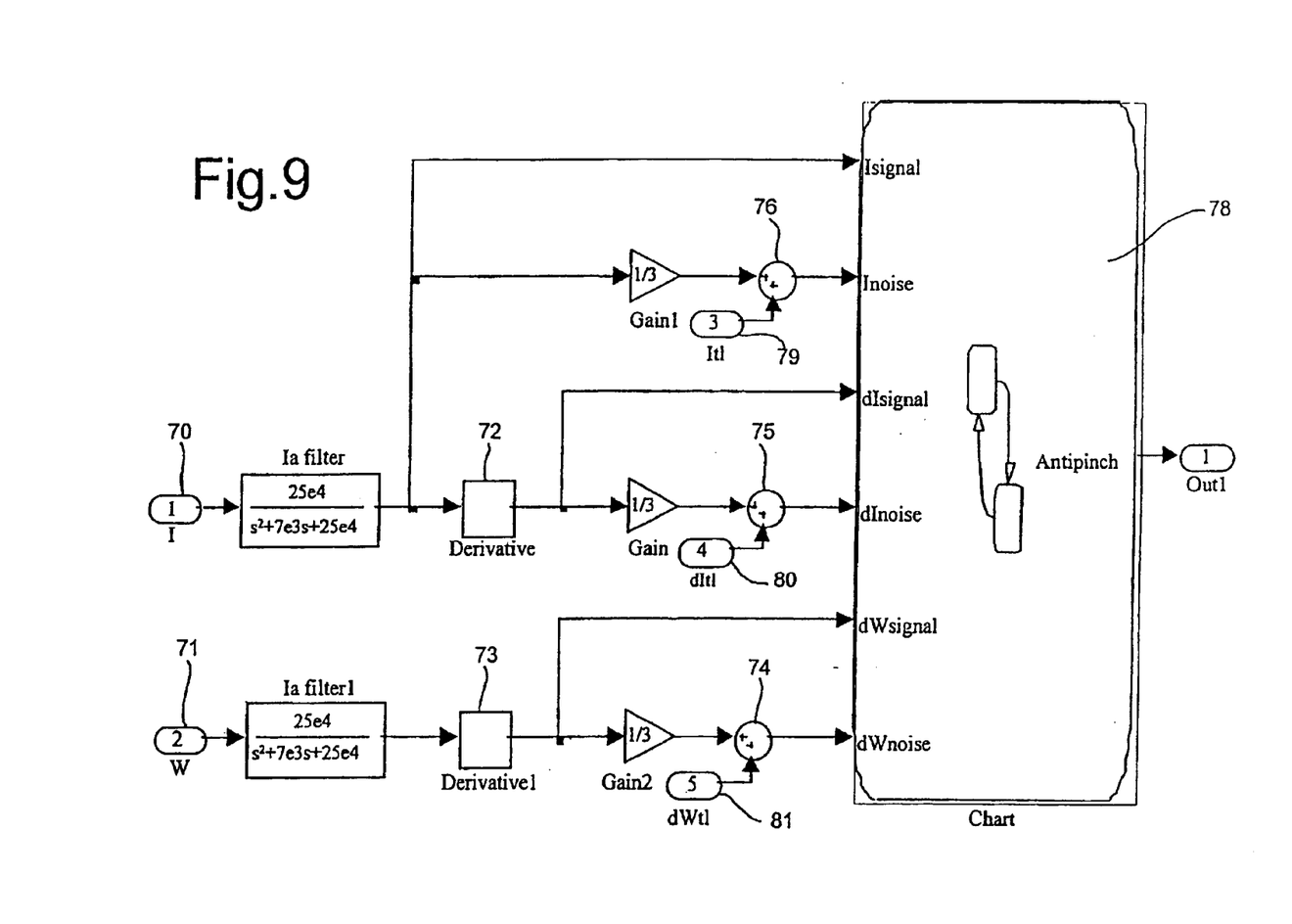
FIG. 9 illustrates a scheme corresponding to an example of the operation principle of the evaluation module indicated in FIG. 6.

Referring to FIG. 9, it may be seen that the evaluation model proposed, is derived from the acquisition of the current intensity supplied to the motor and the angular speed value supplied in the inputs 70 and 71, respectively. Said values are subjected to filtration in 70a and 71a and then, a derivation is applied to them in blocks 72 and 73. The intensity and angular speed values after filtration are supplied to an analysis module 74, to which the values are also supplied after derivation in said blocks 72 and 73 of the intensity and angular speed. Moreover, it is also appreciated that some intensity values are supplied, being derived from the intensity and angular speed, obtained by dividing by three each one of the mentioned values from the filtration 70a and 73 and adding to it in 76, the intensity value 79, in 75, the intensity derivative 80 and in 74, the angular speed derivative 81.

Figure 10:
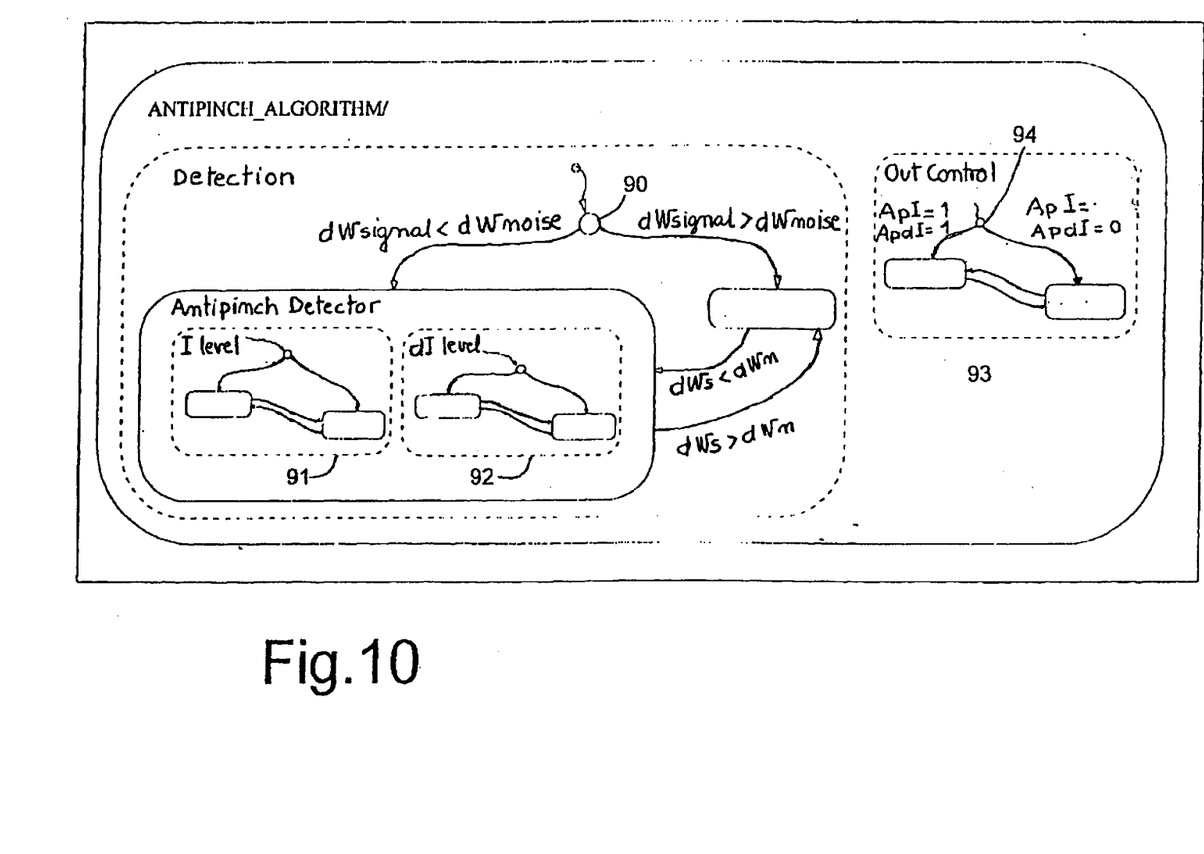
FIG. 10 illustrates an adaptative dual anti-crushing algorithm model, describing a possible implementation of the scheme in FIG. 9.

FIG. 10 shows a control algorithm treatment model as from the values acquired in the analysis module 74, comprising a sequential state machine, where as from the nodes 90 and 94, two situations described in blocks 90 and 94 are considered, self-understood by the descriptions thereof and in parallel in block 93, enabling or disabling anti-crushing triggering depending on the information from said previous blocks.

Specifically and as it may be seen, some values of threshold intensity, intensity evolution and angular speed evolution have been taken into account, together with information of intensity an angular speed values to decide motor activation to prevent crushing.

What is claimed is:

1. A system with hardware and software components to simulate and evaluate at least one management algorithm of a panel, the system being activated by an electric motor, the system having anti-crushing security, the panel being mobile between two extreme positions, the system being operable such that the edge of the panel cannot trap and compress an obstacle interfering in the movement of the panel, the system comprising:

a plurality of probes providing information about a plurality of operation parameters of the electric motor in relation to the panel;

a first model providing a representation of the electric motor, the model indicating at least one of the following plurality of parameters:

electric parameters of the electric motor, electro-mechanical conversion, motor inertia, torque applied to the panel, interactions between the panel and at least one guidance device, and interference with the obstacle;

second model providing a representation of a performance of the panel the second model including:

an interface with the electric motor and a description of an influence of at least one guiding device in the displacement of the panel;

a third model offering a representation of the incidence of the obstacle and providing description related to an inertia of the panel;

a module for evaluation of the algorithm to be evaluated based on a detection of at least one of the following parameters:

current supplied to the electric motor, evolution of said current with respect to time, motor angular speed, evolution of said angular speed value with respect to time, said module operable to receive commands to move the panel and further operable to receive data related to the plurality of probes;

an activation and control model related to starting, stopping and/or changing direction of the motor based on a position and displacement of the panel and further based on a decision provided by the algorithm to be evaluated; and an interface module operable to input commands and display numeric and graphical values related to the system, further operable to integrate components of the system and to perform statistical analysis.

2. A system, according to claim 1, further including an algorithm optimization module.

3. A system, according to claim 1, wherein the obstacle provides at least a minimum force and a maximum force for testing.

4. A system, according to claim 3, wherein the obstacle is simulated by a condenser and the maximum and minimum forces are defined by a greater or lesser load related to the condenser, said condenser being described in a high level language.

5. A system, according to claim 1, wherein the motor is activated and controlled based on at least one of the following variables:
window position;
existence of an obstacle; and
outside activation input.

6. A system, according to claim 5, wherein the activation and control model is an intelligent performance state machine, having a series of states based on user commands, and two main blocks related to a presence of the obstacle or the absence of the obstacle.

7. A system, according to claim 1, wherein said interface module includes an acquisition and data pre-processing stage coming from the motor or a simulated motor.

8. A system, according to claim 1, wherein description of the influence of guidance devices in panel displacement is simulated using a polynomial simulating a dynamic friction of said panel with said guidance devices.

9. A system, according to claim 8, wherein said polynomial is obtained from empirical data, from a type of panel and the guidance devices.

10. A system according to claim 1, further comprising a stage to simulate operation in a continuous cycle of panel or window displacement to demonstrate real time performance of the algorithm.

11. A method of simulating and evaluating management algorithms of a system for a panel or mobile window, the system being activated by an electric motor, the system having anti-crushing security, the panel being between two extreme positions, the system being operable such that the panel closure edge cannot trap and compress an obstacle interfering in the movement of said panel, comprising the steps of:
a) introducing an algorithm to be examined for evaluation according a detection of at least one of a following parameters:
current supplied to the electric motor,
evolution of said current with respect to time,
angular motor speed,
evolution of said angular speed value with respect to time;
b) introducing at least a first descriptive condition of at least a first obstacle;
c) simulating the system based on the algorithm and,
d) evaluating a response capacity of the algorithm to stop and/or displace in a direction away from an obstacle obstructing the mentioned panel.

12. A method, according to claim 11, wherein at least a second descriptive conditions of a second obstacle is provided.

13. A method, according to claim 11, wherein MATLAB is used as a higher level language for at least one component of the system.

14. A method, according to claim 11, wherein at least one result is displayed and a subset of numeric and graphic data is stored.

15. A method, according to claim 13, graphic data includes a representation, in function of time, of the current supplied to the motor, mobile panel position and motor torque for different cycle points including start, ascent, descent with or without the presence of the obstacle.

16. A method, according to claim 11, wherein the evaluation is established according to the value of current supplied to the electric motor and the evolution with respect to time of said current supplied to the electric motor.

17. A method, according to claim 11, wherein evaluation is established according to the angular speed of said electric motor and the evolution with respect to time of the angular speed or acceleration of the electric motor.

18. A method, according to claim 11, wherein the evaluation is established according to the combined evolution with respect to time of the current supplied to the motor and the angular speed of said electric motor, in response to different characteristics of the obstacles interposed in the panel displacement.

19. A method, according to one of claims 11 to 18, wherein threshold intensity values, intensity evolution and angular speed evolution are considered together with information on intensity and angular speed values to decide motor activation to prevent crushing.

20. A computer program product, comprising a computer readable media with instructions, said instruction including instructions to enable a computer to simulate and evaluate management algorithms of a system for a panel or mobile window, the system being activated by an electric motor, the system having anti-crushing security, the panel being between two extreme positions, the security mode of the system being operable such that the panel closure edge cannot trap and compress a user's limb or other object susceptible of interfering in the movement of said panel the instructions further comprising instructions for:
a) introducing an algorithm to be examined for evaluation of said algorithm according a detection of at least one of a following parameters:
current supplied to the electric motor,
evolution of said current with respect to time,
angular motor speed,
evolution of said angular speed value with respect to time;
b) introducing at least one first descriptive condition of at least a first obstacle;
c) simulating the system based on the algorithm and,
d) evaluating a response capacity of the algorithm to stop and/or displace in a direction away from an obstacle obstructing the mentioned panel.

21. The computer program product of claim 20, wherein threshold intensity values, intensity evolution and angular speed evolution are considered together with information on intensity and angular speed values to decide motor activation to prevent crushing.

* * * * *